US012625736B2

(12) United States Patent
Shveidel et al.

(10) Patent No.: US 12,625,736 B2
(45) Date of Patent: May 12, 2026

(54) PROCESSOR CORE SHARING USING VOLUNTARY YIELDING IN A DATA STORAGE SYSTEM HOSTING A CONTAINERIZED SERVICE

(71) Applicant: Dell Products L.P., Round Rock, TX (US)

(72) Inventors: Vladimir Shveidel, Pardes-Hana (IL); Roy Koren, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 468 days.

(21) Appl. No.: 18/239,812

(22) Filed: Aug. 30, 2023

(65) Prior Publication Data

US 2025/0077292 A1     Mar. 6, 2025

(51) Int. Cl.
G06F 9/50          (2006.01)

(52) U.S. Cl.
CPC .......... G06F 9/5044 (2013.01); G06F 9/5033 (2013.01); G06F 9/5038 (2013.01)

(58) Field of Classification Search
CPC ..... G06F 9/5044; G06F 9/5033; G06F 9/5038
USPC .......................................................... 710/7
See application file for complete search history.

(56) References Cited

U.S. PATENT DOCUMENTS 8,065,487 B2    11/2011    Kornegay et al.
8,326,918 B2    12/2012    Khawand et al.

9,842,008 B2    12/2017    Kimmel et al.
10,877,808 B2   12/2020    Aberg et al.
2003/0041090 A1*  2/2003   Armstrong ............ G06F 9/4843
                                                         718/106
2006/0048160 A1    3/2006   Olszewski et al.
2008/0104610 A1*  5/2008   Norton ................ G06F 11/3419
                                                         718/108
2019/0121659 A1    4/2019   Van Riel et al.
2023/0063893 A1*  3/2023   Apfelbaum ........... G06F 9/5044
2023/0315518 A1*  10/2023  Jung ..................... G06F 9/5038
                                                         718/104

OTHER PUBLICATIONS

Hatem Elshazly, Towards Enabling I/O Awareness in Task-based Programming, Nov. 2, 2021, arXiv:2111.01504v1, pp. 1-19 (Year: 2021).*

* cited by examiner

*Primary Examiner* — Pierre Vital
(74) *Attorney, Agent, or Firm* — BainwoodHuang

(57)          ABSTRACT

A shared portion of processor cores is allocated within the processor cores of a data storage system. Each processor core in the shared portion of processor cores is shared between a storage system application executing in the data storage system and a containerized service also executing in the data storage system. A voluntary yield time interval is dynamically generated based on both a workload of the containerized service and a workload of the storage system application. Each processor core in the shared portion of the processor cores is periodically voluntarily yielded by the storage system application, based on the voluntary yield time interval, to allow execution of the containerized service on that processor core.

21 Claims, 4 Drawing Sheets

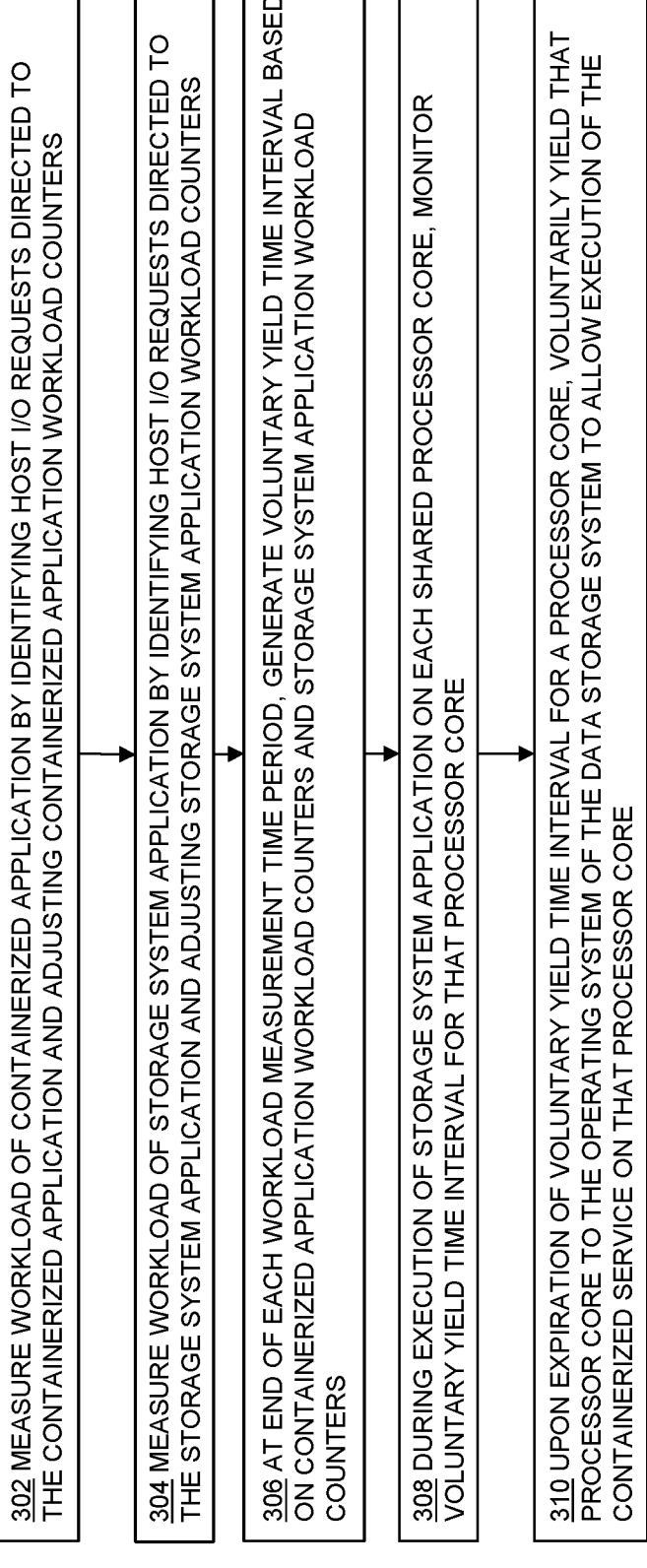

302 MEASURE WORKLOAD OF CONTAINERIZED APPLICATION BY IDENTIFYING HOST I/O REQUESTS DIRECTED TO THE CONTAINERIZED APPLICATION AND ADJUSTING CONTAINERIZED APPLICATION WORKLOAD COUNTERS

304 MEASURE WORKLOAD OF STORAGE SYSTEM APPLICATION BY IDENTIFYING HOST I/O REQUESTS DIRECTED TO THE STORAGE SYSTEM APPLICATION AND ADJUSTING STORAGE SYSTEM APPLICATION WORKLOAD COUNTERS

306 AT END OF EACH WORKLOAD MEASUREMENT TIME PERIOD, GENERATE VOLUNTARY YIELD TIME INTERVAL BASED ON CONTAINERIZED APPLICATION WORKLOAD COUNTERS AND STORAGE SYSTEM APPLICATION WORKLOAD COUNTERS

308 DURING EXECUTION OF STORAGE SYSTEM APPLICATION ON EACH SHARED PROCESSOR CORE, MONITOR VOLUNTARY YIELD TIME INTERVAL FOR THAT PROCESSOR CORE

310 UPON EXPIRATION OF VOLUNTARY YIELD TIME INTERVAL FOR A PROCESSOR CORE, VOLUNTARILY YIELD THAT PROCESSOR CORE TO THE OPERATING SYSTEM OF THE DATA STORAGE SYSTEM TO ALLOW EXECUTION OF THE CONTAINERIZED SERVICE ON THAT PROCESSOR CORE

Fig. 3

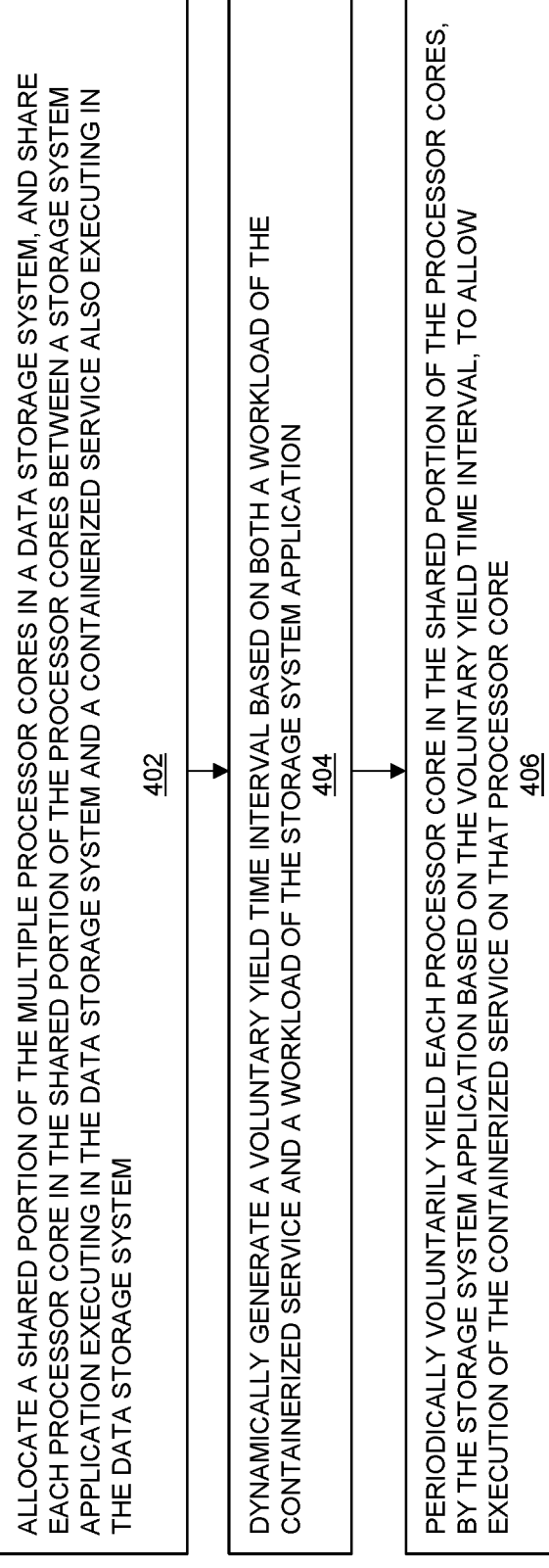

ALLOCATE A SHARED PORTION OF THE MULTIPLE PROCESSOR CORES IN A DATA STORAGE SYSTEM, AND SHARE EACH PROCESSOR CORE IN THE SHARED PORTION OF THE PROCESSOR CORES BETWEEN A STORAGE SYSTEM APPLICATION EXECUTING IN THE DATA STORAGE SYSTEM AND A CONTAINERIZED SERVICE ALSO EXECUTING IN THE DATA STORAGE SYSTEM
402

DYNAMICALLY GENERATE A VOLUNTARY YIELD TIME INTERVAL BASED ON BOTH A WORKLOAD OF THE CONTAINERIZED SERVICE AND A WORKLOAD OF THE STORAGE SYSTEM APPLICATION
404

PERIODICALLY VOLUNTARILY YIELD EACH PROCESSOR CORE IN THE SHARED PORTION OF THE PROCESSOR CORES, BY THE STORAGE SYSTEM APPLICATION BASED ON THE VOLUNTARY YIELD TIME INTERVAL, TO ALLOW EXECUTION OF THE CONTAINERIZED SERVICE ON THAT PROCESSOR CORE
406

Fig. 4

PROCESSOR CORE SHARING USING VOLUNTARY YIELDING IN A DATA STORAGE SYSTEM HOSTING A CONTAINERIZED SERVICE

TECHNICAL FIELD

The present disclosure relates generally to data storage systems that host containerized services.

BACKGROUND

Data storage systems are arrangements of hardware and software that are coupled to non-volatile data storage drives, such as solid state drives and/or magnetic disk drives. The data storage system services host I/O requests received from physical and/or virtual host machines ("hosts"). The host I/O requests received by the data storage system specify host data that is written and/or read by the hosts. The data storage system executes software that processes the host I/O requests by performing various data processing tasks to efficiently organize and persistently store the host data in the non-volatile data storage drives of the data storage system.

SUMMARY

In the disclosed technology, a shared portion of processor cores is allocated within the multiple processor cores of a data storage system. Each processor core in the shared portion of the processor cores is shared between a storage system application executing in the data storage system and a containerized service also executing in the data storage system. A voluntary yield time interval is dynamically generated based on both a workload of the containerized service and a workload of the storage system application. Based on the voluntary yield time interval, the storage system application periodically voluntarily yields each processor core in the shared portion of the plurality of processor cores to allow execution of the containerized service on that processor core.

In some embodiments, the voluntary yield time interval is dynamically generated by measuring the workload of the containerized service based on host I/O (Input/Output) requests received by the data storage system that are directed to the containerized service, measuring the workload of the storage system application based on host I/O requests received by the data storage system that are directed to the storage system application, and then generating the voluntary yield time interval based on a ratio of the workload of the containerized service to the workload of the storage system application.

In some embodiments, the voluntary yield time interval is dynamically generated by generating smaller values for the voluntary yield time interval for larger values of the ratio of the workload of the containerized service to the workload of the storage system application.

In some embodiments, the voluntary yield time interval is dynamically generated based on the ratio of the workload of the containerized service to the workload of the storage system application at least in part by indexing into a table using the ratio of the workload of the containerized service to the workload of the storage system application to retrieve the voluntary yield time interval.

In some embodiments, the host I/O requests received by the data storage system that are directed to the containerized service are identified by identifying those host I/O requests that are received by the data storage system and that are received from at least one SCSI (Small Computer System Interface) initiator that is associated with the containerized service.

In some embodiments, the host I/O requests received by the data storage system that are directed to the containerized service are identified by identifying those of the host I/O requests that are received by the data storage system that are directed to at least one storage volume that is associated with the containerized service.

In some embodiments, periodically voluntarily yielding an individual processor core by the storage system application includes checking whether the voluntary yield time interval has expired for that processor core. In response to the voluntary yield time interval having expired for the processor core, the storage system application voluntarily yields the processor to a scheduler of an operating system of the data storage system.

In some embodiments, all execution threads of the storage system application are set to a first thread priority, and all execution threads of the containerized application are set to a second thread priority. The second thread priority is higher than the first thread priority.

In some embodiments, the containerized service provides a file-based data storage service to one or more hosts, and the storage system application provides a block-based data storage service to one or more hosts.

In some embodiments, the processor cores in the data storage system also include a non-shared portion. Each processor core in the non-shared portion of the processor cores in the data storage system executes only the storage system application.

The disclosed technology is integral to providing a practical technical solution to the problem of sharing processor cores within a data storage system under varying workloads. Embodiments of the disclosed technology use a containerized application to improve the functionality of the data storage system, e.g. by adding a containerized service to the service or services that are already provided by the storage system application. The disclosed technology improves the overall performance of the data storage system across different relative loadings between the storage system application and the containerized application, without requiring the data storage application to have access to the internal operations of the containerized service, by dynamically redistributing shared processor core resources according to the different relative loadings.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

FIG. 3 is a flow chart showing steps performed in some embodiments; and

FIG. 4 is another flow chart showing steps performed in some embodiments.

DETAILED DESCRIPTION

Figure 1:
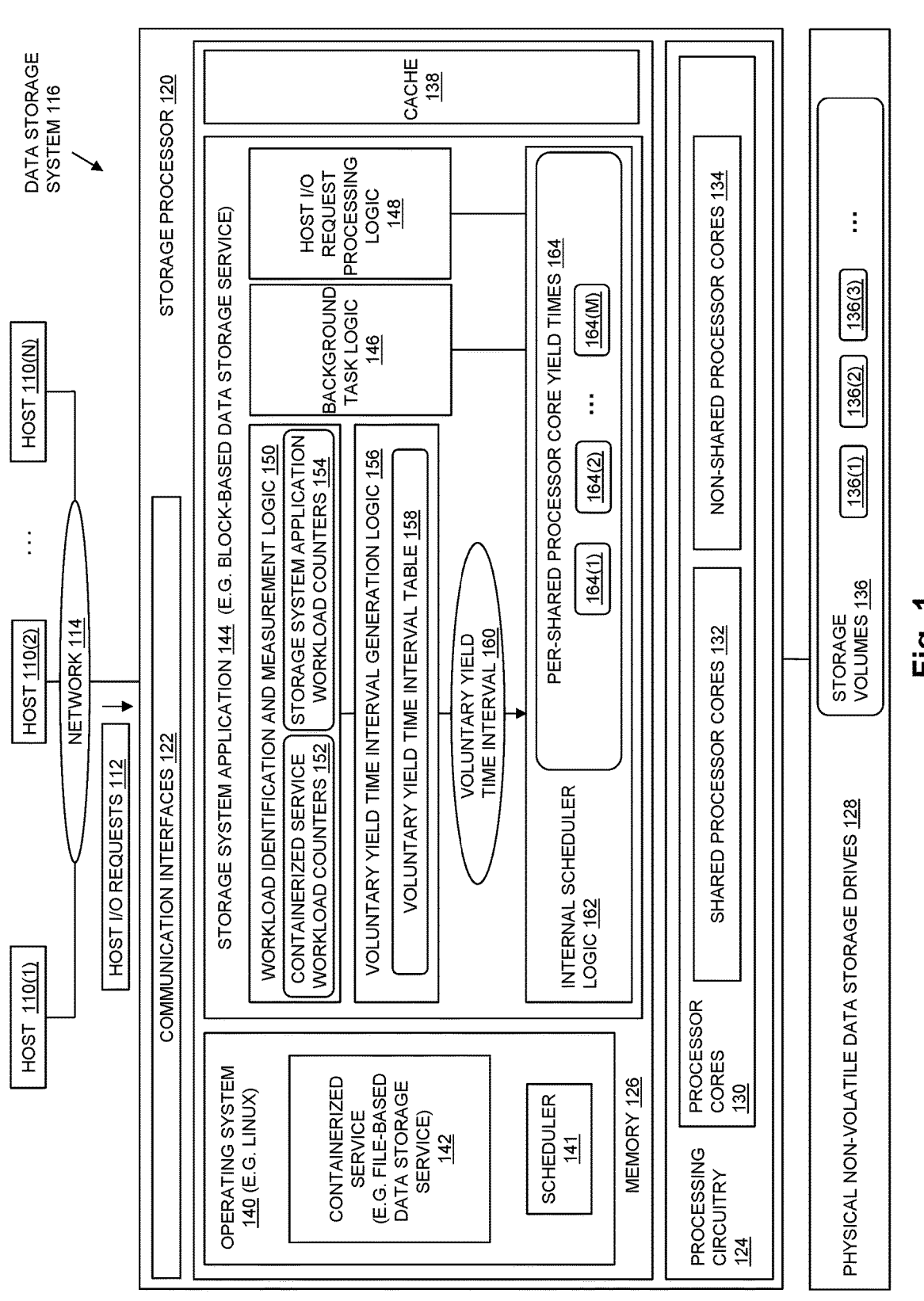
FIG. 1 is a block diagram showing an illustrative example of a data storage system including an embodiment of the disclosed technology.

Embodiments will now be described with reference to the figures. The embodiments described herein are provided only as examples, in order to illustrate various features and principles of the disclosed technology, and are not limiting. The embodiments of disclosed technology described herein are integrated into a practical solution for sharing processor cores with a containerized service that executes in a data storage system.

In embodiments of the disclosed technology, a shared portion of processor cores is allocated within the multiple processor cores of a data storage system. Each processor core in the shared portion of the processor cores is shared between a storage system application executing in the data storage system and a containerized service also executing in the data storage system. A voluntary yield time interval is dynamically generated based on both a workload of the containerized service and a workload of the storage system application. Based on the voluntary yield time interval, the storage system application periodically voluntarily yields each processor core in the shared portion of the plurality of processor cores to allow execution of the containerized service on that processor core.

The voluntary yield time interval may be dynamically generated by measuring the workload of the containerized service based on host I/O (Input/Output) requests received by the data storage system that are directed to the containerized service, measuring the workload of the storage system application based on host I/O requests received by the data storage system that are directed to the storage system application, and then generating the voluntary yield time interval based on a ratio of the workload of the containerized service to the workload of the storage system application.

The voluntary yield time interval may further be dynamically generated by generating smaller values for the voluntary yield time interval for larger values of the ratio of the workload of the containerized service to the workload of the storage system application.

The voluntary yield time interval may further be dynamically generated based on the ratio of the workload of the containerized service to the workload of the storage system application at least in part by indexing into a table using and/or based on the ratio of the workload of the containerized service to the workload of the storage system application to retrieve the voluntary yield time interval.

The host I/O requests received by the data storage system that are directed to the containerized service may be identified by identifying those host I/O requests that are received by the data storage system and that are received from at least one SCSI (Small Computer System Interface) initiator that is associated with the containerized service.

The host I/O requests received by the data storage system that are directed to the containerized service may also or alternatively be identified by identifying those of the host I/O requests that are received by the data storage system that are directed to at least one storage volume that is associated with the containerized service.

The periodic voluntary yielding of an individual processor core by the storage system application may include checking whether the voluntary yield time interval has expired for that processor core. In response to the voluntary yield time interval having expired for the processor core, the storage system application voluntarily yields the processor to a scheduler of an operating system of the data storage system.

All execution threads of the storage system application may be set to a first thread priority, and all execution threads of the containerized application may be set to a second thread priority. The second thread priority is higher than the first thread priority.

For example, the containerized service may provide a file-based data storage service to one or more hosts, and the storage system application may provide a block-based data storage service to one or more hosts.

The processor cores in the data storage system may also include a non-shared portion. Each processor core in the non-shared portion of the processor cores in the data storage system executes only the storage system application.

FIG. 1 is a block diagram showing an operational environment for the disclosed technology, including an example of a data storage system in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications executing thereon may access non-volatile data storage provided by Data Storage System 116, for example over one or more networks, such as a local area network (LAN), and/or a wide area network (WAN) such as the Internet, etc., and shown for purposes of illustration in FIG. 1 by Network 114. Alternatively, or in addition, one or more of Hosts 110 and/or applications accessing non-volatile data storage provided by Data Storage System 116 may execute within Data Storage System 116.

Data Storage System 116 includes at least one Storage Processor 120 that is communicably coupled to both Network 114 and Physical Non-Volatile Data Storage Drives 128, e.g. at least in part though one or more Communication Interfaces 122. No particular hardware configuration is required, and Storage Processor 120 may be embodied as any specific type of device that is capable of processing host input/output (I/O) requests (e.g. I/O read requests and I/O write requests, etc.), and of persistently storing host data.

The Physical Non-Volatile Data Storage Drives 128 may include physical data storage drives such as solid state drives, magnetic disk drives, hybrid drives, optical drives, and/or other specific types of drives. Portions of non-volatile data storage located in Physical Non-Volatile Data Storage Drives 128 may be organized by Data Storage System 116 into some number of logical Storage Volumes 136, e.g. storage volume 136(1), storage volume 136(2), storage volume 136(3), etc.

A Memory 126 in Storage Processor 120 stores program code that is executed on Processing Circuitry 124, as well as data generated and/or processed by such program code. Memory 126 may include volatile memory (e.g. RAM), and/or other types of memory.

Memory 126 may include and/or be communicably coupled with a Cache 138. Cache 138 may be used to cache host data received by Storage Processor 120 from Hosts 110 (e.g. host data indicated in I/O write requests). Host data stored in Cache 138 is flushed from time to time from Cache 138 into Physical Non-Volatile Data Storage Drives 128.

Processing Circuitry 124 includes or consists of multiple Processor Cores 130, e.g. within one or more multi-core processor packages. Each processor core in Processor Cores 130 includes or consists of a separate processing unit, sometimes referred to as a Central Processing Unit (CPU). Each individual processor core in Processor Cores 130 is made up of separate electronic circuitry that is capable of independently executing instructions. Processor Cores 130 includes an allocated shared portion, shown by Shared Processor Cores 132. Shared Processor Cores 132 are processor cores that are allocated (e.g. by Storage System Application 144) for sharing between Storage System Application 144 and Containerized Service 142, and that accordingly may execute Storage System Application 144 and/or Containerized Service 142. Processor Cores 130 also includes a non-shared portion, shown by Non-Shared Processor Cores 134. Non-Shared Processor Cores 134 are processor cores that are used exclusively to execute Storage System Application 136.

Processing Circuitry 124 and Memory 126 together form control circuitry that is configured and arranged to carry out various methods and functions described herein. The Memory 126 stores a variety of software components that may be provided in the form of executable program code. For example, Memory 126 may include software components such as Storage System Application 144 and Operating System 140. When program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also include various other specific types of software components.

In the example of FIG. 1, Storage System Application 144 is an application executing in Data Storage System 116, and provides a block-based (aka "block level") data storage service to one or more of the Hosts 110. The block-based data storage service provided by Storage System Application 144 processes block-based I/O requests received by Data Storage System 116 from Hosts 110. The block-based I/O requests processed by Storage System Application 144 enable the Hosts 110 to indicate blocks of host data that is written to and read from blocks of the non-volatile data storage that is served by Data Storage System 116. The block-based I/O requests processed by Storage System Application 144 are communicated to Data Storage System 116 by Hosts 110 using a block-based storage protocol that is supported by Storage System Application 144. In this way, Storage System Application 144 enables the Hosts 110 to connect to Data Storage System 116 using a block-based data storage protocol. Examples of block-based data storage protocols that may be supported by Storage System Application 144 in various embodiments include without limitation Fibre Channel (FC), Internet Small Computer Systems Interface (iSCSI), and/or Non-Volatile Memory Express (NVMe) protocols.

Storage System Application 144 may also provide its block-based data storage service to the Containerized Service 150.

Host I/O Request Processing Logic 148 in Storage System Application 144 performs host I/O request processing. The host I/O request processing performed by Host I/O Request Processing Logic 148 consists of in-line processing of block-based host I/O requests that are received by Data Storage System 116. In the case of a received I/O write request, Host I/O Request Processing Logic 148 performs all processing that is necessary to perform before an acknowledgement is returned to the host indicating that the host data indicated by the I/O write request has been securely stored by Data Storage System 116. Such processing includes securely storing the host data indicated by the I/O write request either into the Cache 136 and/or into Physical Non-Volatile Data Storage Drives 128. In the case of a received I/O read request, Host I/O Request Processing Logic 148 performs the processing that is necessary to perform before the host data requested by the I/O read request is returned to the host. Such processing includes reading the requested data from Cache 138 or Physical Non-Volatile Data Storage Drives 128, and may further include performing any additional data processing that may be necessary, such as decompression, decryption, etc., of the host data.

Background Task Logic 146 in Storage System Application 144 performs background work item processing. The background work item processing performed by Background Task Logic 146 is background processing of host data that is not performed in-line by Host I/O Request Processing Logic 148, and that may accordingly be deferred. Such background processing of host data performed by Background Task Logic 146 includes processing of host data indicated by an I/O write request that can be performed after an acknowledgement is returned to the host indicating that the host data indicated by the host I/O write request has been securely stored in the Data Storage System 116. One example of background work item processing that is performed by Background Task Logic 146 is flushing of host data indicated by I/O write requests from Cache 138 to Physical Non-Volatile Data Storage Drives 128. Other examples of background work item processing performed by Background Task Logic 146 are compression, deduplication, and/or encryption of host data stored in either Cache 138 and/or Physical Non-Volatile Data Storage Drives 128.

Containerized Service 142 is a containerized service that is installed in an Operating System 140 that executes in Data Storage System 116. Operating System 140 may, for example, be embodied using the Linux operating system. Containerized Service 142 may, for example, include file-based data storage service logic that provides a file-level data storage service, and that is packaged with its own software logic, libraries, and/or configuration files in a software container that is installed into Operating System 140. For example, in some embodiments, Containerized Service 142 may be provided as a Docker container hosted in a Docker Engine, as developed by Docker, Inc.

Execution of Containerized Service 142 provides a file-based (aka "file-level") data storage service to one or more of the Hosts 110. The file-based data storage service provided by Containerized Service 142 processes file-based I/O requests received by Data Storage System 116 from Hosts 110. The file-based I/O requests received by Data Storage System 116 from Hosts 110 and processed by Containerized Service 142 access files that are served by Containerized Service 142 to the Hosts 110, and that are stored in the Physical Non-Volatile Data Storage Drives 128. In this way, Containerized Service 142 provides file-level storage and acts as Network Attached Storage (NAS) for the Hosts 110. The file-based I/O requests processed by Containerized Service 142 are communicated to Data Storage System 116 by Hosts 110 using a file-based storage protocol that is supported by Containerized Service 142. Containerized Service 142 enables the Hosts 110 to connect to Data Storage System 116 using such a file-based storage protocol. Examples of file-based storage protocols that may be supported by Containerized Service 142 include without limitation Network File System (NFS) and/or Server Message Block (SMB) protocols.

During operation of the components shown in FIG. 1, Voluntary Yield Time Interval 160 is dynamically generated by Voluntary Yield Time Interval Generation Logic 156 of Storage System Application 144. Voluntary Yield Time Interval Generation Logic 156 generates Voluntary Yield Time Interval 160 based on both i) a measured workload of the Containerized Service 142, and ii) a measured workload of the Storage System Application 144. Voluntary Yield Time Interval Generation Logic 156 passes Voluntary Yield Time Interval 160 to the Internal Scheduler Logic 162 of Storage System Application 144.

Based on the voluntary yield time interval, Internal Scheduler Logic 162 periodically voluntarily yields each processor core in the Shared Processor Cores 132 to the Scheduler 141 of Operating System 140. Each time one of the shared processor cores in Shared Processor Cores 132 is voluntarily yielded to Scheduler 141 by Internal Scheduler Logic 162, Storage System Application 144 temporarily stops execution on that processor core, and Scheduler 141 is allowed to schedule execution of Containerized Service 142 on that processor core, e.g. by executing a thread of execution of Containerized Service 142 on that processor core. In this way, voluntary yielding of each individual shared processor core in Shared Processor Cores 132 may allow Containerized Service 142 to execute on that processor core.

For example, after Scheduler 140 of Operating System 140 schedules execution of Storage System Application 144 on one of the shared processor cores in Shared Processor Cores 132, Internal Scheduler Logic 162 operates within Storage System Application 144 to schedule individual units of work (e.g. "jobs") performed by Storage System Application 144 on that processor core. Such jobs may, for example, include execution of Background Task Logic 146, Host I/O Request Processing Logic 148, and/or of other ones of the components of Storage System Application 144 shown in FIG. 1. At certain points in time, each job scheduled by Internal Scheduler Logic 162 on an individual shared processor core may pause execution, or complete execution, and at those points in time Internal Scheduler Logic 162 is invoked to schedule execution of a different job on that shared processor core. For example, a job executing on a shared processor core that initiates a read of host data from the Physical Non-Volatile Data Storage Drives 128 may pause execution while waiting for the host data to be returned from Physical Non-Volatile Data Storage Drives 128, causing Internal Scheduler Logic 162 to be invoked and schedule another job for execution on that shared processor core during the waiting period. In another example, a job that requires decompression of host data may pause execution to wait for the host data to be decompressed by dedicated decompression logic, similarly causing Internal Scheduler Logic 162 to be invoked so that a different job can be executed on the shared processor core while the host data is being decompressed. And in another example, a job executing on a shared processor core that requires synchronized mirroring of host data with another node (e.g. another storage processor of Data Storage System 116) may pause execution while waiting for confirmation that the host data has been successfully mirrored to the other node, similarly causing Internal Scheduler Logic 162 to be invoked. Those skilled in the art will recognize that the foregoing examples are not exhaustive.

Each time Internal Scheduler Logic 162 is invoked by a job executing on one of the shared processor cores in Shared Processor Cores 132, it determines whether the Voluntary Yield Time Interval 160 has expired for that shared processor. For example, for each one of the shared processor cores, a time at which that processor core was last yielded may be stored by Internal Scheduler 162. In the example of FIG. 1, the times at which each shared processor core was last voluntarily yielded are shown by Per-Shared Processor Core Yield Times 164, where each one of the timestamps 164(1), 164(2), through 164(M) stores the time at which a corresponding one of the shared processor cores was last voluntarily yielded to Scheduler 141. Each time it is invoked by a job executing on one of the shared processor cores, Internal Scheduler Logic 162 checks whether the amount of time since that shared processor core was last voluntarily yielded exceeds Voluntary Yield Time Interval 160. If so, then Internal Scheduler Logic 162 determines that the Voluntary Yield Time Interval 160 has expired for that processor core, which causes Internal Scheduler Logic 162 to voluntarily yield that shared processor core to Scheduler 141, thus allowing Scheduler 141 to schedule Containerized Service 142 for execution on that shared processor core. For example, in the case where Operating System 140 is embodied as the Linux operating system, Internal Scheduler Logic 162 may voluntarily yield a shared processor core to Scheduler 141 by invoking the sched_yield( ) function.

Voluntary Yield Time Interval Generation Logic 156 may dynamically generate Voluntary Yield Time Interval 160 based on measurements performed by Workload Identification and Measurement Logic 150 of i) the workload of Containerized Service 142, and ii) the workload of Storage System Application 144. Workload Identification and Measurement Logic 150 may measure the workload of Containerized Service 142 based the host I/O requests within Host I/O Requests 112 that are directed to Containerized Service 142. Similarly, Workload Identification and Measurement Logic 150 may measure the workload of Storage System Application 144 based on the host I/O requests that are directed to Storage System Application 144 within Host I/O Requests 112. Voluntary Yield Time Interval Generation Logic 156 may periodically generate Voluntary Yield Time Interval 160 based on a ratio of the workload of Containerized Service 142 to the workload of the Storage System Application 144, as measured during a preceding workload measurement time period. For example, Voluntary Yield Time Interval Generation Logic 156 may generate a new Voluntary Yield Time Interval 160 at the end of each workload measurement time period using the workload of Containerized Service 142 and the workload of Storage System Application 144 measured during the preceding workload measurement time period. The workload measurement time period may be preconfigured, for example, to a time period having a duration of between one five seconds.

Voluntary Yield Time Interval Generation Logic 156 may dynamically generate Voluntary Yield Time Interval 160 by generating smaller values for Voluntary Yield Time Interval 160 for larger values of the ratio of the workload of Containerized Service 142 to the workload of Storage System Application 144.

Voluntary Yield Time Interval Generation Logic 156 may dynamically generate Voluntary Yield Time Interval 160 based on the ratio of the workload of Containerized Service 142 to the workload of Storage System Application 144 by indexing into the Voluntary Yield Time Interval Table 158 using and/or based on the ratio of the workload of Containerized Service 142 to the workload of Storage System Application 144 to retrieve Voluntary Yield Time Interval 160 from Voluntary Yield Time Interval 160 from Voluntary Yield Time Interval Table 158. In this way, Voluntary Yield Time Interface Table 158 may be used to map values of the ratio of the workload of Containerized Service 142 to the workload of Storage System Application 144 to specific values of Voluntary Yield Time Interval 160. For example, in some embodiments, Voluntary Yield Time Interval Table 158 may include entries corresponding to individual subranges within the range of values possible for the ratio of the workload of Containerized Service 142 to the workload of Storage System Application 144. For example, Voluntary Yield Time Interval Table 158 may include 10-20 entries, each of which corresponds to a subrange of the possible values for the ratio of the workload of Containerized Service 142 to the workload of Storage System Application 144, and contains the value of Voluntary Yield Time Interval 160 to be generated for values of the ratio of the workload of Containerized Service 142 to the workload of Storage System Application 144 that fall within that subrange. Entries in Voluntary Yield Time Interval Table 148 corresponding to higher sub-ranges of possible values for the ratio of the workload of Containerized Service 142 to the workload of Storage System Application 144 contain smaller values of Voluntary Yield Time Interval 160. In this way, values of the ratio of the workload of Containerized Service 142 to the workload of Storage System Application 144 may be used to index into Voluntary Yield Time Interval Table 158 to generate Voluntary Yield Time Interval 160. The values of Voluntary Yield Time Interval 160 in the entries of Voluntary Yield Time Interval Table 148 may be preconfigured, and may be determined based on test runs performed to find optimal voluntary yield rates that provide the best overall performance for Data Storage System 116 for each one of the sub-ranges.

In some embodiments, Workload Identification and Measurement Logic 150 may distinguish between i) host I/O requests that are directed to Containerized Service 142 and ii) host I/O requests that are directed to Storage System Application 144, based on the SCSI (Small Computer System Interface) initiator and/or the target storage volume of the individual host I/O requests. For example, Workload Identification and Measurement Logic 150 may identify host I/O requests within Host I/O Requests 112 that are directed to Containerized Service 142 by identifying those host I/O requests within Host I/O Requests 112 that are received from at least one SCSI (Small Computer System Interface) initiator that sends host I/O requests directed to Containerized Service 142. Accordingly, those host I/O requests within Host I/O Requests 112 that are received from an SCSI initiator in a first set of one or more SCSI initiators associated with Containerized Service 142 may be identified as host I/O requests directed to Containerized Service 142. Similarly, Workload Identification and Measurement Logic 150 may identify host I/O requests within Host I/O Requests 112 that are received from SCSI initiators in a second, completely different set of one or more SCSI initiators in Hosts 110 may be identified as host I/O requests directed to Containerized Service 142.

Alternatively, or in addition, Workload Identification and Measurement Logic 150 may identify host I/O requests within Host I/O Requests 112 that are directed to Containerized Service 142 by identifying those host I/O requests within Host I/O Requests 112 that write to or read from one or more storage volumes that are written to or read from by host I/O requests directed to Containerized Service 142. Accordingly, each host I/O request within Host I/O Requests 112 that writes to or reads from a storage volume in a first set of one or more storage volumes in Storage Volumes 136 may be identified as a host I/O request directed to Containerized Service 142. Similarly, Workload Identification and Measurement Logic 150 may identify each host I/O request within Host I/O Requests 112 that writes to or reads from a storage volume in a second, completely different set of storage volumes in Storage Volumes 136 may be identified as host I/O requests directed to Storage System Application 144.

Workload Identification and Measurement Logic 150 may monitor the workloads of Containerized Service 142 and Storage System Application 144 during each workload measurement time period using Containerized Service Workload Counters 152 and Storage System Application Workload Counters 154. Containerized Service Workload Counters 152 include a read operations counter that is used to count the total number of host I/O read requests directed to the Containerized Service 142 during each workload measurement time period, a write throughput counter that is used to count the total number of host I/O write requests directed to the Containerized Service 142 during each workload measurement time period, a read bandwidth counter that is used to count the total amount of bytes read by host I/O read requests directed to the Containerized Service 142 during each workload measurement time period, and a write bandwidth counter that is used to count the total amount of bytes written by host I/O read requests directed to the Containerized Service 142 during each workload measurement time period. Similarly, Storage System Application Workload Counters 154 include a read operations counter that is used to count the total number of host I/O read requests directed to the Storage System Application 144 during each workload measurement time period, a write throughput counter that is used to count the total number of host I/O write requests directed to the Storage System Application 144 during each workload measurement time period, a read bandwidth counter that is used to count the total amount of bytes read by host I/O read requests directed to the Storage System Application 144 during each workload measurement time period, and a write bandwidth counter that is used to count the total amount of bytes written by host I/O read requests directed to the Storage System Application 144 during each workload measurement time period.

At the end of each workload measurement time period, Voluntary Yield Time Interval Generation Logic 156 may determine a ratio of the workload of the Containerized Service 142 to the workload of the Storage System Application 144 during the preceding workload measurement time period using the values of the Containerized Service Workload Counters 152 and Storage System Application Workload Counters 154. For example, the workload of the Containerized Service 142 may be calculated based on the values of Containerized Service Workload Counters 152 as a sum of the read IOPS (I/O operations per second), write IOPS, read bandwidth, and write bandwidth for the Containerized Service 142 during the preceding workload measurement time period. Similarly, the workload of the Storage System Application 144 may be calculated based on the values of Storage System Application Workload Counters 154 as a sum of the read IOPS (I/O operations per second), write IOPS, read bandwidth, and write bandwidth for the Storage System Application 144 during the preceding workload measurement time period.

In some embodiments, Voluntary Yield Time Interval Generation Logic 156 may use tuning coefficients to normalize the workloads of Containerized Service 142 and Storage System Application 144 before determining the ratio of Containerized Service 142 workload to Storage System Application 144 workload. The normalized workloads may be calculated by multiplying individual workload components by pre-determined performance tuning coefficients, e.g. C1, C2, C3, C4, etc. The performance tuning coefficients may be used to represent cost factors such as i) cost per host I/O request, ii) cost per I/O byte, iii) difference in costs between read and write operations, and/or other cost factors. In such embodiments, for example, Voluntary Yield Time Interval Generation Logic 156 may calculate each workload it calculates using the tuning coefficients as follows:

$$C1*IOPS\ read + C2*IOPS\_write +$$
$$C3*Bandwidth\_read + C4*Bandwidth\_write$$

In some embodiments, Storage System Application 144 may cause Operating System 140 to set all execution threads of Storage System Application 144 to a first thread priority, and also cause Operating System 140 to set all execution threads of Containerized Service 142 to a second thread priority. The second thread priority is higher than the first thread priority. In such embodiments, the likelihood of a work item of Containerized Service 142 that is ready to execute being scheduled for execution on a shared processor core when that processor core is voluntarily yielded by Storage System Application 144 may be further increased.

Figure 2:
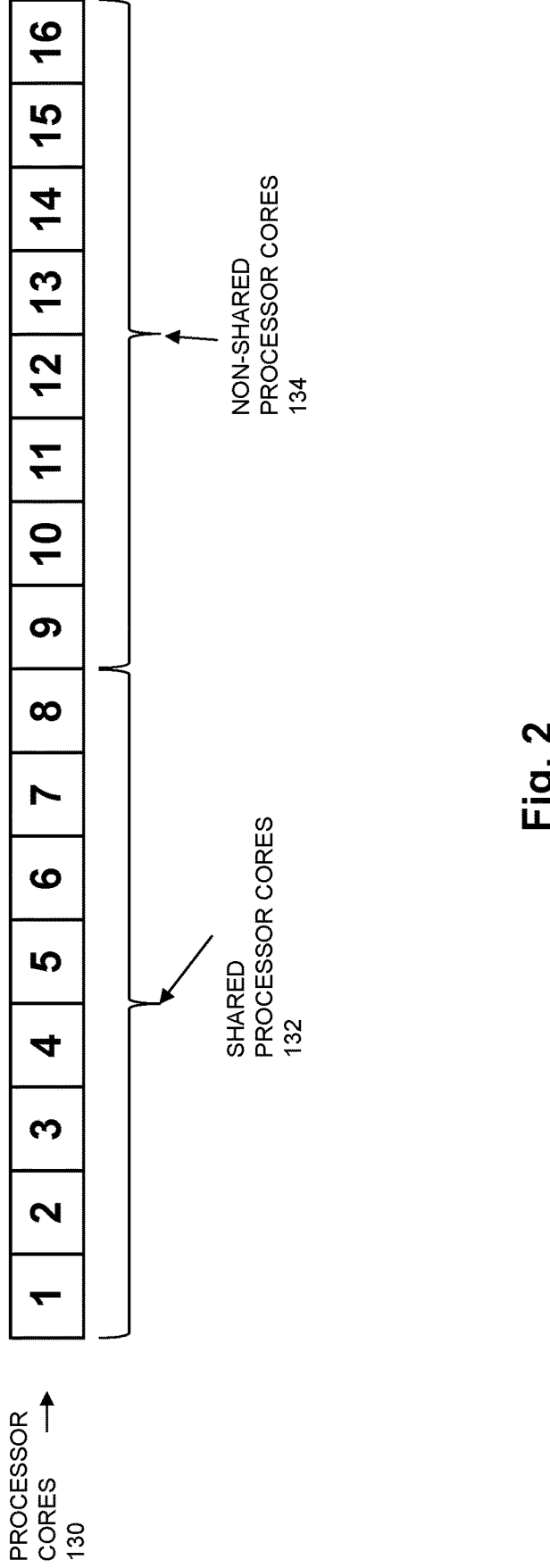
FIG. 2 is a block diagram showing an example of shared processor cores and non-shared processor cores allocated within the processor cores of a data storage system.

FIG. 2 shows an example in which Processor Cores 130 is made up of sixteen processor cores, with processor cores 1-8 allocated to Shared Processor Cores 132, and processor cores 9-16 allocated to Non-Shared Processor Cores 134. In the example of FIG. 2, processor cores 1-8 are shared between Storage System Application 144 and Containerized Service 142, and accordingly may execute Storage System Application 144 and/or Containerized Service 142. The processor cores 9-16 are used exclusively to execute Storage System Application 136. Those skilled in the art will recognize that any specific number of processor cores may be used, and that the shared and non-shared portions of the processor cores may each include any specific number of processor cores.

FIG. 3 is a flow chart showing steps performed in some embodiments. At step 302, a workload of a containerized application is measured by identifying host I/O requests directed to the containerized application and adjusting containerized application workload counters based on the identified host I/O requests.

At step 304, a workload of a storage system application is measured by identifying host I/O requests directed to the storage system application and adjusting storage system application workload counters based on the identified host I/O requests.

At step 306, at the end of each workload measurement time period, a voluntary yield time interval is generated based on the containerized application workload counters and storage system application workload counters, e.g. by using a ratio of the workload of the containerized application workload to the workload of the storage system application to select an entry in a table to find a voluntary yield time interval value corresponding to the ratio.

At step 308, during execution of the storage system application on each shared processor core in a portion of shared processor cores within the processor cores of the data storage system, the storage system application monitors the voluntary yield time interval for that processor core to determine whether the voluntary yield time interval has expired.

At step 310, in response to detecting the expiration of the voluntary yield time interval for one of the shared processor cores, the storage system application voluntarily yields that processor core to a scheduler of the operating system of the data storage system to allow execution of the containerized service on that processor core.

FIG. 4 is another flow chart showing steps performed in some embodiments.

At step 402, a shared portion of the multiple processor cores in a data storage system is allocated, and each processor core in the shared portion of the processor cores is shared between a storage system application executing in the data storage system and a containerized service also executing in the data storage system.

At step 404, a voluntary yield time interval is dynamically generated based on both a workload of the containerized service and a workload of the storage system application.

At step 406, each processor core in the shared portion of the processor cores is voluntarily yielded by the storage system application based on the voluntary yield time interval, to allow execution of the containerized service on that processor core.

As will be appreciated by those skilled in the art, aspects of the technology disclosed herein may be embodied as a system, method, or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
allocating a shared portion of a plurality of processor cores in a data storage system, wherein each processor core in the shared portion of the plurality of processor cores is shared between a storage system application executing in the data storage system and a containerized service also executing in the data storage system;
dynamically generating a voluntary yield time interval based on both a workload of the containerized service and a workload of the storage system application; and
periodically voluntarily yielding each processor core in the shared portion of the plurality of processor cores, by the storage system application based on the voluntary yield time interval, to allow execution of the containerized service on that processor core.

2. The method of claim 1, wherein dynamically generating the voluntary yield time interval comprises:
measuring the workload of the containerized service based on host I/O (Input/Output) requests received by the data storage system that are directed to the containerized service;
measuring the workload of the storage system application based on host I/O requests received by the data storage system that are directed to the storage system application; and
generating the voluntary yield time interval based on a ratio of the workload of the containerized service to the workload of the storage system application.

3. The method of claim 2, wherein dynamically generating the voluntary yield time interval comprises generating smaller values for the voluntary yield time interval for larger values of the ratio of the of the workload of the containerized service to the workload of the storage system application.

4. The method of claim 3, wherein dynamically generating the voluntary yield time interval based on the ratio of the workload of the containerized service to the workload of the storage system application further comprises indexing into a table using the ratio of the workload of the containerized service to the workload of the storage system application to retrieve the voluntary yield time interval.

5. The method of claim 2, further comprising:
identifying the host I/O requests received by the data storage system that are directed to the containerized service by identifying those host I/O requests received by the data storage system that are received from at least one SCSI (Small Computer System Interface) initiator associated with the containerized service.

6. The method of claim 2, further comprising:
identifying the host I/O requests received by the data storage system that are directed to the containerized service by identifying those host I/O requests received by the data storage system that are directed to at least one storage volume associated with the containerized service.

7. The method of claim 1, wherein periodically voluntarily yielding the processor core by the storage system application comprises:
checking whether the voluntary yield time interval has expired for the processor core; and
in response to the voluntary yield time interval having expired for the processor core, voluntarily yielding the processor to a scheduler of an operating system of the data storage system.

8. The method of claim 7, further comprising:
setting all execution threads of the storage system application to a first thread priority; and
setting all execution threads of the containerized application to a second thread priority, wherein the second thread priority is higher than the first thread priority.

9. The method of claim 1, wherein the containerized service provides a file-based data storage service to one or more hosts; and
wherein the storage system application provides a block-based data storage service to one or more hosts.

10. The method of claim 1, wherein the plurality of processor cores in the data storage system further includes a non-shared portion; and
wherein each processor core in the non-shared portion of the plurality of processor cores in the data storage system executes only the storage system application.

11. A data storage system comprising:
processing circuitry and a memory;
a plurality of non-volatile data storage drives; and
wherein the memory has program code stored thereon, wherein the program code, when executed by the processing circuitry, causes the processing circuitry to:
allocate a shared portion of a plurality of processor cores in the processing circuitry of the data storage system, wherein each processor core in the shared portion of the plurality of processor cores is shared between a storage system application executing in the data storage system and a containerized service also executing in the data storage system;
dynamically generate a voluntary yield time interval based on both a workload of the containerized service and a workload of the storage system application; and
periodically voluntarily yield each processor core in the shared portion of the plurality of processor cores, by the storage system application based on the voluntary yield time interval, to allow execution of the containerized service on that processor core.

12. The data storage system of claim 11, wherein the program code, when executed by the processing circuitry, causes the processing circuitry to dynamically generating the voluntary yield time interval at least in part by causing the processing circuitry to:
measure the workload of the containerized service based on host I/O (Input/Output) requests received by the data storage system that are directed to the containerized service;

measure the workload of the storage system application based on host I/O requests received by the data storage system that are directed to the storage system application; and generate the voluntary yield time interval based on a ratio of the workload of the containerized service to the workload of the storage system application.

13. The data storage system of claim 12, wherein the program code, when executed by the processing circuitry, further causes the processing circuitry to dynamically generate the voluntary yield time interval at least in part by causing the processing circuitry to generate smaller values for the voluntary yield time interval for larger values of the ratio of the of the workload of the containerized service to the workload of the storage system application.

14. The data storage system of claim 13, wherein the program code, when executed by the processing circuitry, further causes the processing circuitry to dynamically generate the voluntary yield time interval based on the ratio of the workload of the containerized service to the workload of the storage system application at least in part by causing the processing circuitry to index into a table using the ratio of the workload of the containerized service to the workload of the storage system application to retrieve the voluntary yield time interval.

15. The data storage system of claim 12, wherein the program code, when executed by the processing circuitry, further causes the processing circuitry to:

identify the host I/O requests received by the data storage system that are directed to the containerized service by identifying those host I/O requests received by the data storage system that are received from at least one SCSI (Small Computer System Interface) initiator associated with the containerized service.

16. The data storage system of claim 12, wherein the program code, when executed by the processing circuitry, further causes the processing circuitry to:

identify the host I/O requests received by the data storage system that are directed to the containerized service by identifying those host I/O requests received by the data storage system that are directed to at least one storage volume associated with the containerized service.

17. The data storage system of claim 11, wherein causing the processing circuitry to periodically voluntarily yield the processor core includes causing the processing circuitry to:

check whether the voluntary yield time interval has expired for the processor core; and in response to the voluntary yield time interval having expired for the processor core, voluntarily yield the processor to a scheduler of an operating system of the data storage system.

18. The data storage system of claim 17, wherein the program code, when executed by the processing circuitry, further causes the processing circuitry to:

set all execution threads of the storage system application to a first thread priority; and set all execution threads of the containerized application to a second thread priority, wherein the second thread priority is higher than the first thread priority.

19. The data storage system of claim 11, wherein the containerized service provides a file-based data storage service to one or more hosts; and wherein the storage system application provides a block-based data storage service to one or more hosts.

20. The data storage system of claim 11, wherein the plurality of processor cores in the processing circuitry of the data storage system further includes a non-shared portion; and wherein each processor core in the non-shared portion of the plurality of processor cores in the processing circuitry of the data storage system executes only the storage system application.

21. A computer program product including a non-transitory computer readable medium having instructions stored thereon, wherein the instructions, when executed on processing circuitry, cause the processing circuitry to perform steps including:

allocating a shared portion of a plurality of processor cores in a data storage system, wherein each processor core in the shared portion of the plurality of processor cores is shared between a storage system application executing in the data storage system and a containerized service also executing in the data storage system;

dynamically generating a voluntary yield time interval based on both a workload of the containerized service and a workload of the storage system application; and periodically voluntarily yielding each processor core in the shared portion of the plurality of processor cores, by the storage system application based on the voluntary yield time interval, to allow execution of the containerized service on that processor core.

* * * * *